Oct. 13, 1936.   J. H. RAST   2,057,591
SEAT FOR AUTOMOBILES AND THE LIKE
Filed June 10, 1933   6 Sheets-Sheet 3
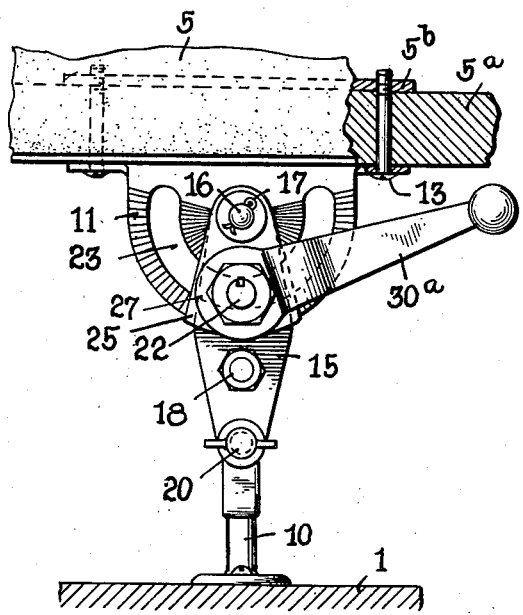
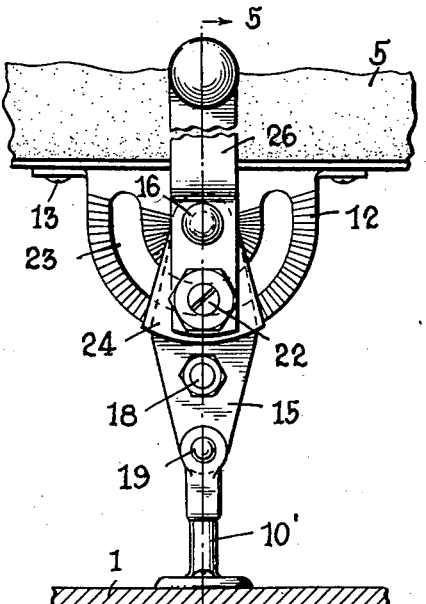
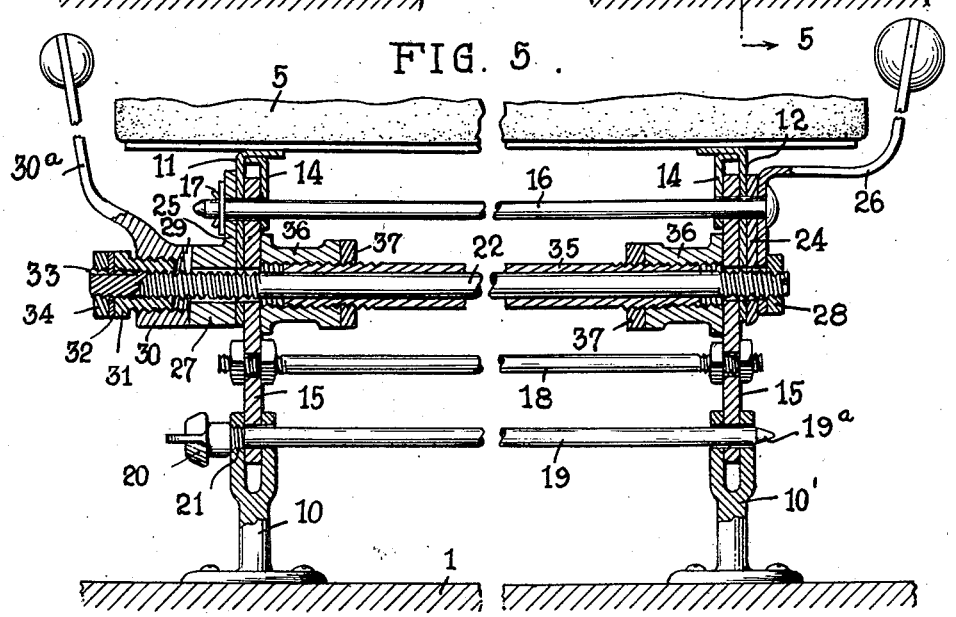

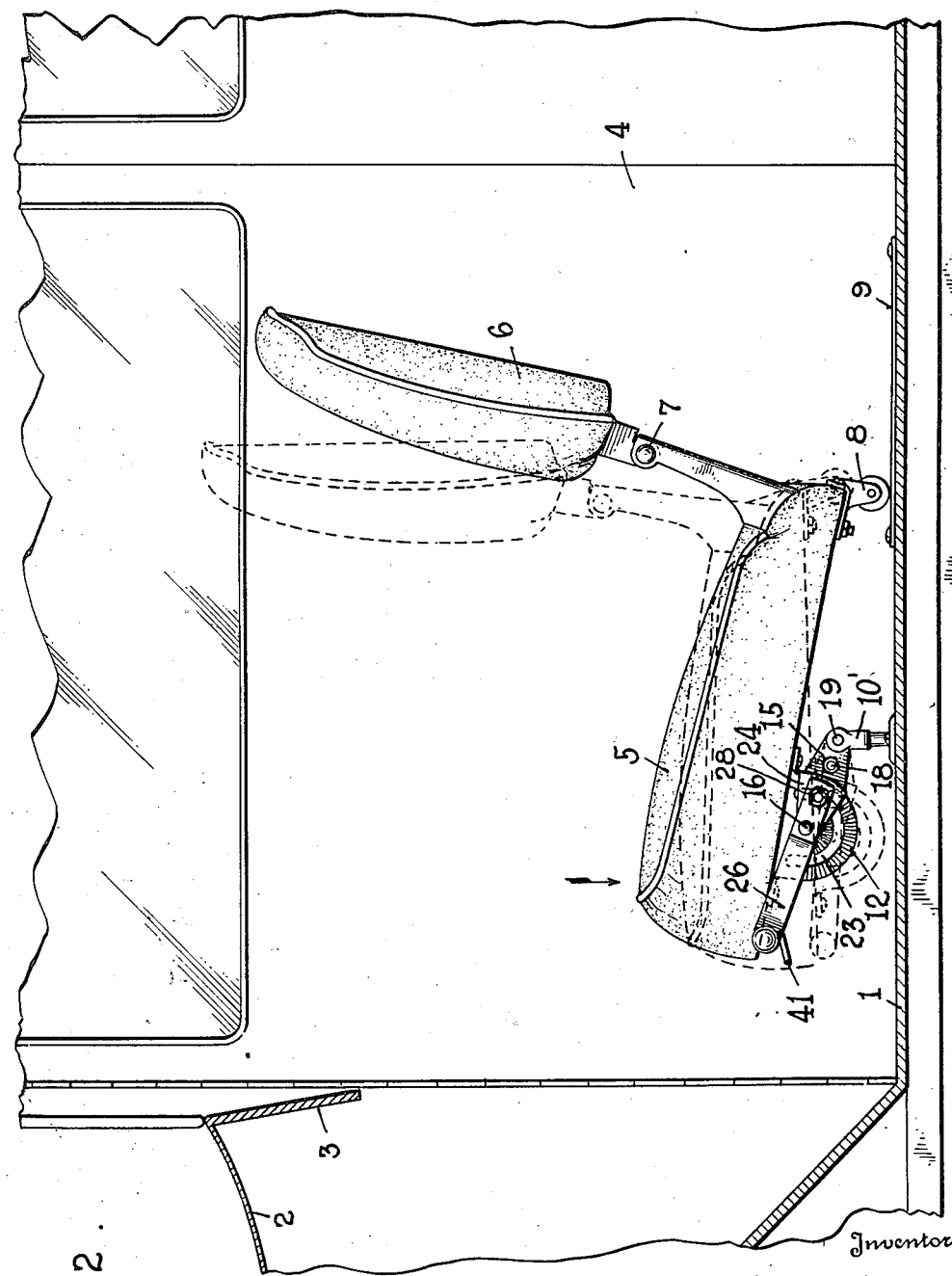

Oct. 13, 1936.  J. H. RAST  2,057,591
SEAT FOR AUTOMOBILES AND THE LIKE
Filed June 10, 1933  6 Sheets-Sheet 4

Inventor
Julius H. Rast,
By Stone, Boyden & Mack,
Attorneys

Oct. 13, 1936. J. H. RAST 2,057,591
SEAT FOR AUTOMOBILES AND THE LIKE
Filed June 10, 1933 6 Sheets-Sheet 5

Oct. 13, 1936.  J. H. RAST  2,057,591

SEAT FOR AUTOMOBILES AND THE LIKE

Filed June 10, 1933    6 Sheets-Sheet 6

Inventor
Julius H. Rast,
By Stone, Boyden & Mack,
Attorneys.

Patented Oct. 13, 1936

2,057,591

UNITED STATES PATENT OFFICE 2,057,591

SEAT FOR AUTOMOBILES AND THE LIKE

Julius H. Rast, Charleston, S. C.

Application June 10, 1933, Serial No. 675,317

8 Claims. (Cl. 155—14)

This invention relates to chairs or seats, and more particularly to adjustable seats designed especially for use in vehicles such as automobiles.

In the coach type of automobile body, only one door is provided on each side, and this is located adjacent the front end. The front seats are usually made in the form of individual chairs, and the right hand chair or seat is mounted so that it may be moved forwardly in order to afford a passageway between the door and rear seat, so that passengers may readily get in or out of the car.

One object of the present invention is to provide improved means for so supporting the front seat that it may be readily shifted, so as to afford access to the rear seat, as above mentioned.

Another object is to provide improved means whereby the front seat may be thus shifted by the person occupying the seat and without leaving the seat, thus avoiding the necessity of the passenger in the front seat getting out of the automobile in order that other passengers may have access to and from the rear seat.

Another object of the invention is to provide improved mechanism by which such front seat may not only be shifted back and forth as required, but may be adjusted to different more or less inclined angular positions, as may be desired, and may be rigidly locked in any position to which it is shifted. In this way, a passenger may adjust the degree of angularity of the seat to suit his own taste or comfort.

A still further object of the invention is to devise simple and practical means by which the front seat of a vehicle may be reversed so that the occupant may face the passengers on the rear seat, if desired. In its broader aspects, the invention contemplates the reversal of any ordinary type of seat now in common use, but specifically provides for mounting, in reverse position, a seat equipped with the improved supporting and adjusting mechanism above referred to.

In practice, it is usual to pivotally mount the front seat on anchoring devices such as eye posts or the like, the brackets or eye members on the seat being connected with such eye posts by means of individual pins or bolts secured in position either by nuts and lock washers or by cotter pins. In either case, the removal of these pivot pins or bolts usually requires the use of special tools and is a more or less difficult and time consuming operation.

It is frequently desirable to disconnect the seat from the usual eye posts or anchoring means above referred to, either for the purpose of removing the seat entirely so that baggage or other articles may be accommodated, or for the purpose of reversing the seat, as hereinafter described.

Another object of the invention, therefore, is to provide an improved pivot pin for connecting the seat with the anchoring means, such pin extending approximately the full width of the seat, and being readily removable from one side of the seat, without the use of any tools, and without the necessity for releasing lock nuts or cotter pins.

Other subsidiary objects will hereinafter appear as the description progresses.

While the invention has special utility when applied to the seats of automobiles and the like, many of the features, in their broader aspects, are capable of many other uses and applications, as well.

In order that the invention may be readily understood, reference is had to the accompanying drawings, forming part of this specification, and in which:

Fig. 2 is a view similar to Fig. 1, but illustrating the seat in a different position, and showing in dotted lines still another position to which it may be shifted;

Figs. 3 and 4 are side elevations on an enlarged scale of the opposite ends of one form of my improved supporting adjusting and locking mechanism, parts being shown in section and parts broken away;

Fig. 5 is a longitudinal section through such mechanism substantially on the line 5—5 of Fig. 4, looking in the direction of the arrows;

Figure 1:
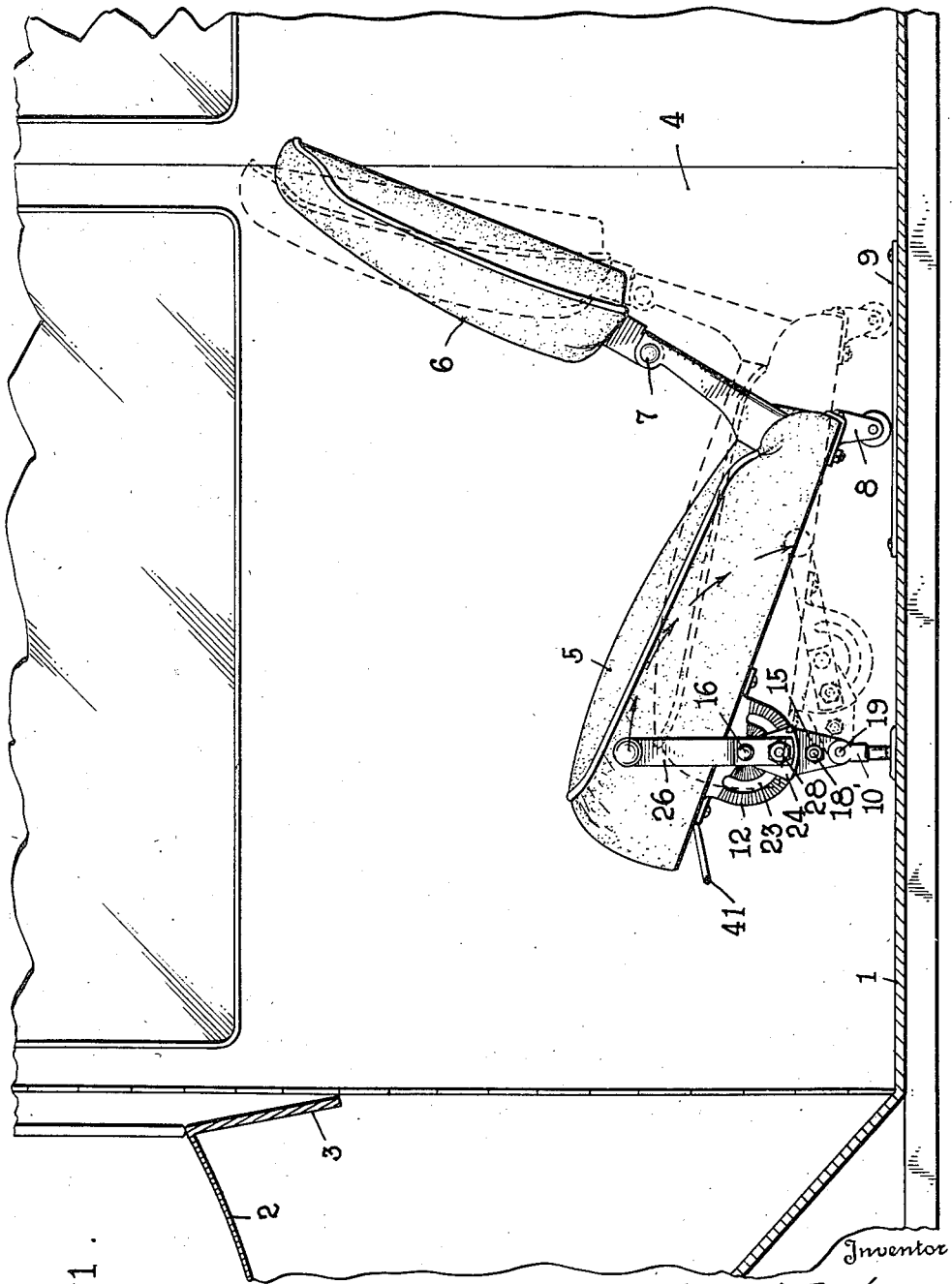
Fig. 1 is a side elevation of the interior of a coach type automobile body showing my improved seat mounted therein, parts being broken away, and parts being in section.
Figure 6:
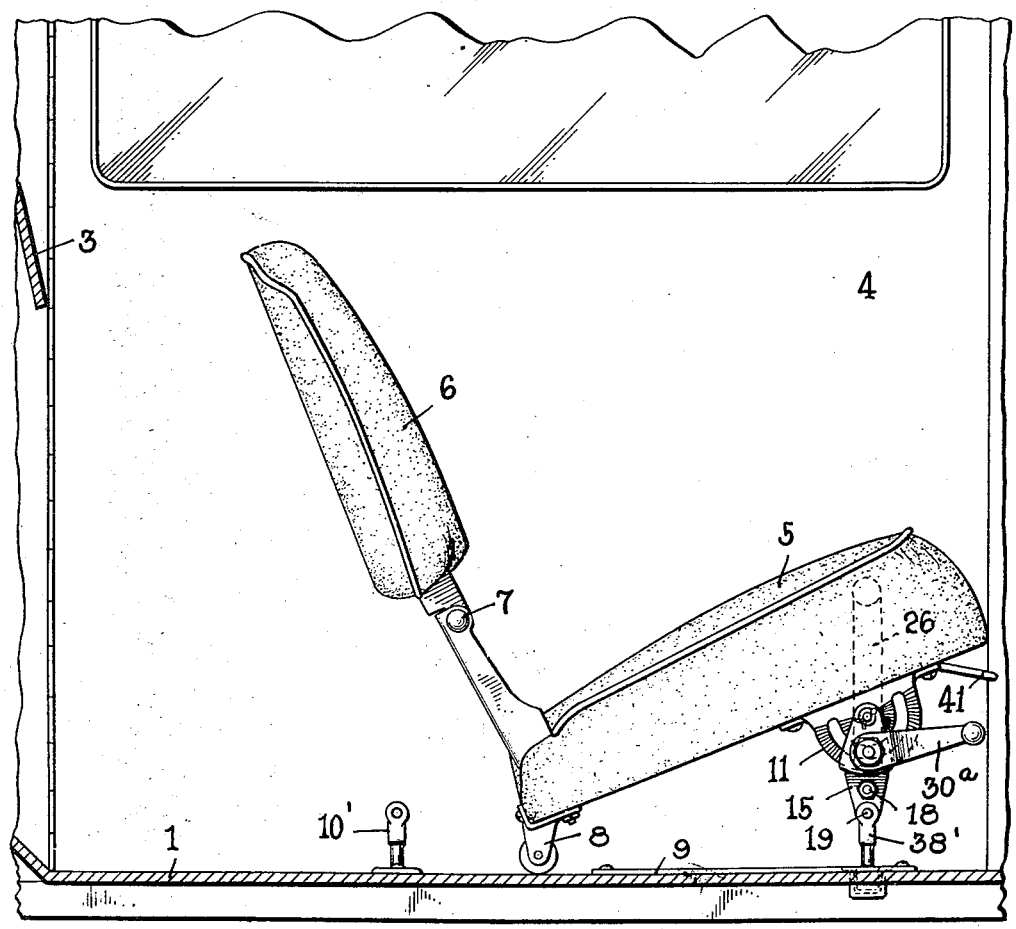
Fig. 6 is a view similar to Fig. 1, but showing the seat in reversed position, facing the rear of the vehicle.
Figure 7:
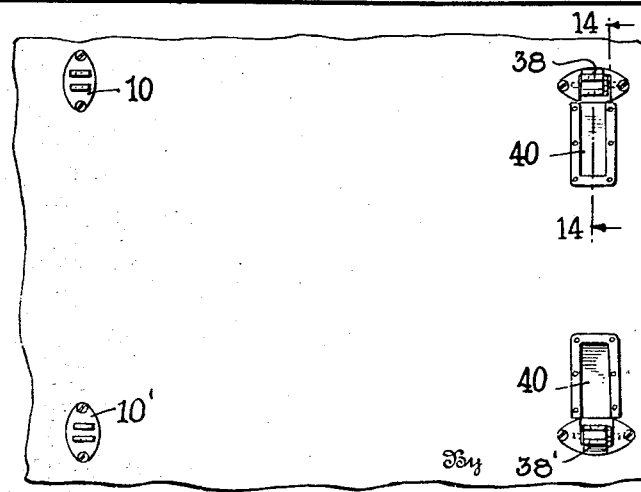
Fig. 7 is a fragmentary plan view of the usual and additional anchoring means which I employ in order to effect the reversal of the seat.
Figure 10:
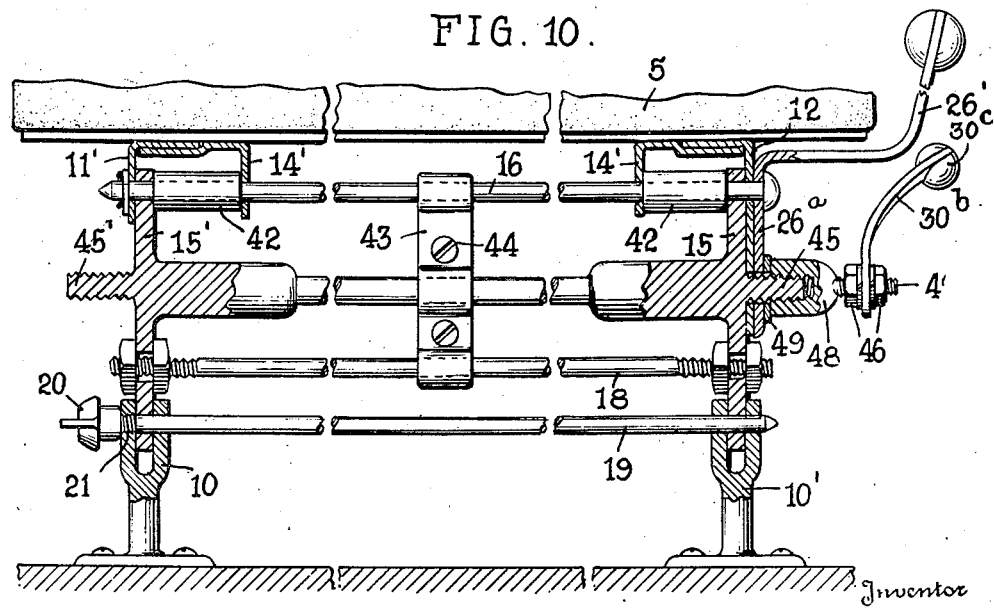
Fig. 10 is a sectional view similar to Fig. 5, but illustrating the modification shown in Figs. 8 and 9.
Figure 10A:
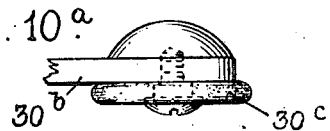
Figure 11:
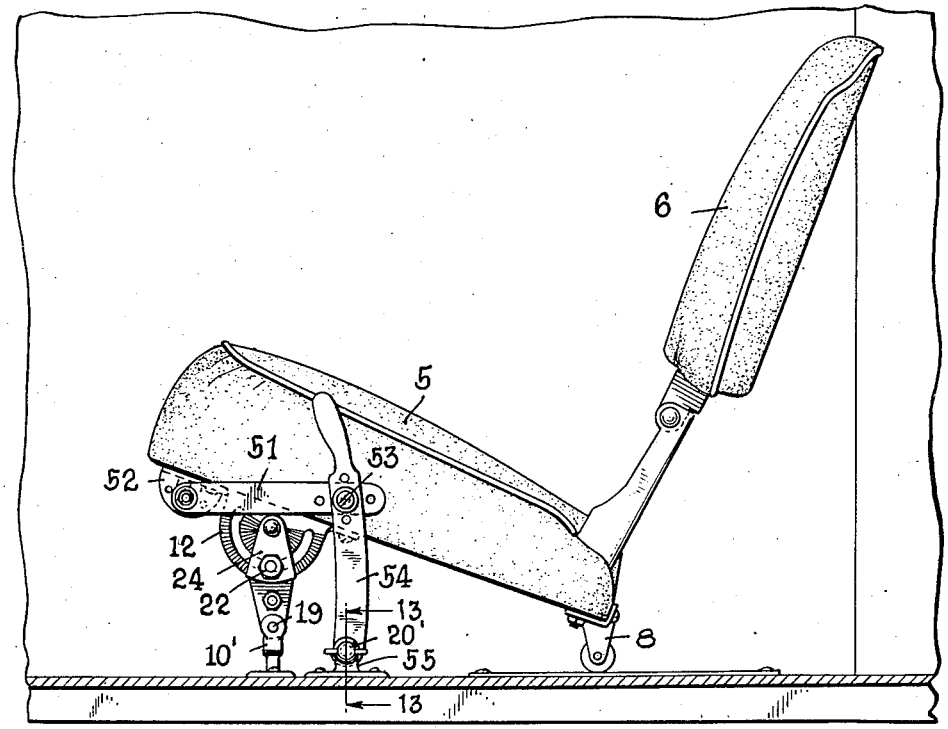
Figure 12:
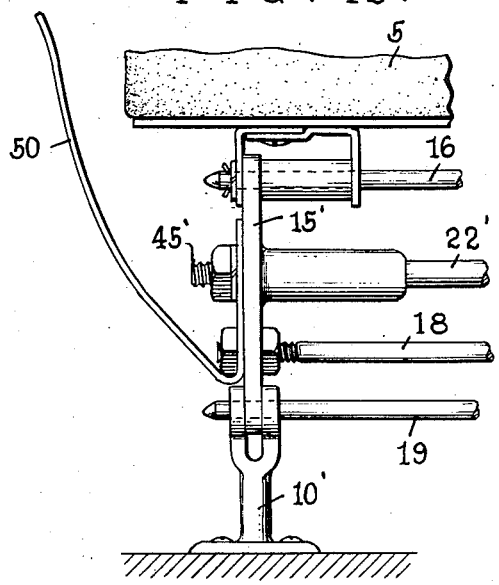
Figure 13:
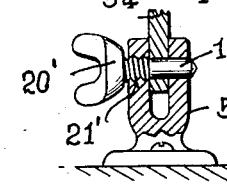
Figure 14:
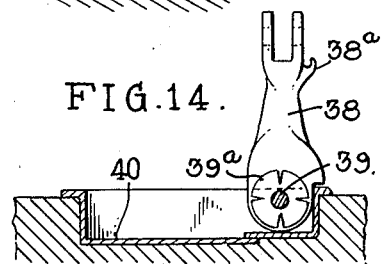

Fig. 10ᵃ is a view of a modification of the end portion of the locking lever shown in Fig. 10;

Fig. 11 is a side elevation similar to Fig. 1, but showing a still further modified form of adjusting mechanism;

Fig. 12 is a fragmentary front elevation of mechanism such as shown in Fig. 10, but illustrating a still further slightly modified arrangement;

Fig. 13 is a fragmentary section on an enlarged scale taken substantially on the line 13—13 of Fig. 11; and Fig. 14 is a sectional elevation on an enlarged scale of one of the eye posts shown in Figs. 6 and 7, the section being taken substantially on the line 14—14 of Fig. 7, looking in the direction of the arrows.

Referring to the drawings in detail, and first more particularly to Figs. 1 to 5 thereof, I designates the floor of an automobile body of the coach type, 2 the cowl, 3 the dash or instrument board and 4 the door.

I have shown my improvements as applied to a conventional chair or seat comprising a seat portion proper 5, and a back portion 6, the latter being secured to the frame of the seat portion by means of the usual rule joint 7.

In order that the seat may be adjusted forwardly and rearwardly, as hereinafter described, I preferably support it at the back on suitable rollers or castors 8 and in order that these may roll smoothly, there may be provided beneath them strips 9 of metal or other suitable material.

The usual anchoring means for supporting the front of the seat are shown as double or bifurcated eye posts 10 and 10' mounted on the floor of the vehicle. My improved supporting and adjusting mechanism is pivotally mounted on these posts, as hereinafter described.

Secured to the lower surface of the seat are a pair of segmental locking plates 11 and 12, arranged one adjacent each side of the seat. These may conveniently be held in position by means of screws 13 passing through the flanged upper portion of the plates and taking in threaded holes in a bar 5$^b$ on the inside of the frame 5$^a$ of the seat 5. Brackets 14 are also secured to and spaced slightly from the inside of the plates 11 and 12 to provide between themselves and such plates a space to receive the upper ends of a pair of supporting links 15. The said upper ends of these links and the plates 11 and 12 and brackets 14 are provided with registering openings through which passes a pivot pin 16 secured in position as by means of a cotter pin 17.

The links 15 are shown as rigidly connected by means of a tie rod 18 having threaded ends equipped with clamping nuts, and the lower ends of the links are provided with holes or eyes adapted to register with corresponding eyes in the anchoring devices or double eye posts 10 and 10'.

In order to provide a pivotal connection for these parts, and instead of using separate pins or bolts with their attendant complications and difficulties, I preferably employ a single rod 19 extending transversely of the seat from one post to the other and being of a length somewhat greater than the distance between these posts. One end of the rod 19 is preferably pointed, as shown at 19$^a$, in order to facilitate its insertion through the eyes in the posts and links. The other end is provided with a head 20 carrying a wing nut by means of which it may be turned, and adjacent this head is provided with a relatively short threaded portion 21. The eye in the outer leg of the post 10 is internally threaded to receive the threaded portion 21 of the rod, and thus hold it against accidental displacement. The remaining portion of the body of the rod is smooth and passes loosely through all of the other eyes of the posts and links. It will thus be seen that if, for any reason, it is desired to disconnect the seat from the anchoring posts 10 and 10', it is only necessary to grasp the wing nut at the head 20 with the fingers and give the same a few turns to unscrew the threaded portion 21, and thereupon the rod 19 may be withdrawn entirely, thus disconnecting both links 15 from the anchor posts. Similarly, when it is desired to again connect the links to the anchor posts, it is an easy matter to insert the rod 19 through the aligned eyes in the several members, this operation being carried out from one side (preferably the outside) only of the seat.

Extending between and passing through openings in the links 15 at a point between the rods 16 and 18 is a pull rod 22 having threaded ends. The plates 11 and 12 are provided with arcuate slots 23 which work freely over the rod 22. Adjacent and outside of the plate 12 is a clamping member 24 through which both the rods 16 and 22 pass, and secured against this locking member 22 and also held in position by the rods 16 and 22 is an operating handle or lever 26, which extends outwardly and upwardly into a position readily accessible to the occupant of the seat.

Adjacent and outside of the plate 11 is another locking member 27, through which both the rods 16 and 22 pass, the opposite end of the rod 22 having a nut 28 serving to hold the parts together.

The outer face of the locking member 27 is shaped to form a portion of a helical cam surface, and against this cam surface works a complementary cam surface formed on the inner face of a clamping nut 30 which is formed integral with an operating handle 30$^a$, as shown in Figs. 3 and 5. This nut 30 works on a threaded sleeve 31 which is itself screwed upon the threaded end of rod 22. Preferably a lock nut 34 is applied to the end of this rod and between the lock nut 34 and threaded sleeve 31 is interposed a lock washer having a lug engaging in a longitudinal groove 33 in the rod 22 for the purpose of preventing accidental rotation of the parts.

From the foregoing, it will be seen that when the nut 30 is rotated on the threaded sleeve 31 by means of the operating handle 30$^a$, it travels on the threads in a direction toward the locking member 27, and at the same time the complementary cam faces come into engagement, and the combined action of these cam faces and of the screw threads serves to draw the rod 22 to the left, as viewed in Fig. 5, and compress the locking members 27 and 24 between the nuts 28 and 30. This clamps the locking plates 11 and 12 between the respective links 15 and the locking members 24 and 27, thus producing an efficient friction grip which serves to rigidly lock the parts against relative movement. It will be noted that the plates 11 and 12 are provided with radial corrugations comprising rough surfaces which effectively resist slipping when the locking members have been actuated.

In order to sustain the thrust on the pull rod 22, a tubular strut 35 is provided through which the rod 22 freely passes, this strut having at its ends threaded nuts 36 constituting adjustable abutments which bear against the inner faces of the links 15 and which are held in position by lock nuts 37.

The general operation of my improved seat arrangement is as follows. The normal position of the seat is somewhat as shown in Fig. 1, either in the full line position in which the seat is tilted or inclined rearwardly at the maximum angle or in some other position such as illustrated in dotted lines in which the seat lies somewhat further to the rear and in which it is at less of an angle or less inclined. Between these two extremes the occupant can adjust the seat as he prefers. Such adjustment is effected by releasing the locking means by unscrewing the nut 30 by means of the handle 30ª, and then manipulating the operating lever 26 either forwardly or rearwardly, as desired. The shifting movement may be assisted by pushing with the feet upon the floor boards or by leaning against the back of the seat. When the desired position is reached, the seat is locked rigidly in such position by tightening up the nut 30, as above explained.

When it is desired to shift the seat forwardly so as to clear the door and permit passengers to easily get in or out of the back seat, the clamping nut is released as before and the lever 26 thrust forwardly. The operation is facilitated by the occupant of the chair simultaneously throwing his weight toward the front edge. As a result of this operation, the chair moves forward and downward to the position shown in full lines in Fig. 2. In this extreme position, the links 15 have reached their limit of movement relative to the slotted plates 11 and 12. During such movement the castors 8 roll along the strips or runways 9.

The position shown in full lines in Fig. 2 will ordinarily afford ample clearance between the back of the seat and the door frame, but if still greater clearance is desired, the seat and links as a unit may be further tilted about the rod 19 as a pivot by pressing down on the front edge of the seat, as shown by the arrow, so as to swing the back of the seat still further forward into the position shown in dotted lines. Thus it will be seen that I have provided a frame comprising the members 15, 16, 18, 19 and 22, which is pivoted at its upper end to the seat and is capable of limited movement relative thereto, this frame being pivoted at its lower ends to the supporting posts or anchoring device in such manner as to be capable of a greater angular movement, whereby after the seat has been shifted to its limit of movement relative to the frame, then the frame and seat as a unit can be still further shifted about the pivotal connection of the anchoring devices.

In shifting the seat rearwardly again to normal position from the position shown in Fig. 2, the occupant pulls up on the lever 26 and at the same time presses against the back of the seat, as this facilitates the operation.

Referring now to Figs. 6 and 7, I have illustrated my improved arrangement for supporting the front seat in reversed position so that the occupant may face the rear seat. This is accomplished by providing, in addition to the usual supporting posts 10 and 10', additional anchoring devices or posts 38 and 38', these being so located on the floor of the vehicle as to accommodate the seat in reverse position without interfering with the door on the one hand and the gear lever on the other. In this reversed position, it will be understood that the rear of the seat is still supported on the castors 8 as before.

As previously already intimated, the reversing of the seat is very simple. All that it is necessary to do is to remove the rod 19, shown in Fig. 10. Thereupon the seat can be lifted clear of the posts 10 and 10', and turned around. The ends of the links 15 are then placed between the legs of the additional supporting posts 38 and 38' and the rod 19 inserted through the eyes of these posts and the eyes in the lower ends of the links. It will of course be understood that the eye in one leg of one of these posts, as for example the post 38, is internally threaded to receive the threaded portion 21 of the rod 19, the same as one of the legs of the post 10. When the seat is supported on the special posts 38 and 38' as described, its angularity or inclination may of course be adjusted in the same way as when it is in normal position, since identically the same supporting mechanism is employed. In order to facilitate moving the seat, it may be provided with one or more handles 41 secured to the lower side of the seat, as shown in Figs. 1, 2 and 6.

In order that the special posts 38 may not obstruct the passageway between the door and rear seat while the front seat is in its normal position, I preferably arrange at least the outer one of these special posts so that it may be folded down into a position flush with the floor when not in use. In Figs. 7 and 14 of the drawings, I have illustrated the post 38 as mounted upon a pivot pin 39 carried by a box or pocket 40 set into the floor. This pocket constitutes a recess into which the post may be folded when not in use. The post may be provided with a lug 38ª, by means of which it may be raised from the recess when desired, and on either side of the post adjacent the pivot pin spring washers 39ª may be arranged to yieldingly hold the post in position and prevent rattling. Although the drawings illustrate both of the posts provided with a recess or pocket of the kind described, it will usually be necessary to employ such a pocket in connection with the outer post only.

While I have shown the seat as connected with the special posts 38 and 38' by means of the links 15 and associated adjusting mechanism, it will of course be understood that I contemplate as falling within the spirit of the invention also connecting a seat to such special posts by means of the ordinary eye members with which seats are usually equipped. Thus, by providing special posts such as 38 and 38', and my improved pivot rod 19, it becomes a simple matter to reverse the front seat of any car as now commonly constructed. In this case, of course, it would not be necessary to employ the castors 8, as any usual form of foot, knob or button would be satisfactory.

Figure 8:
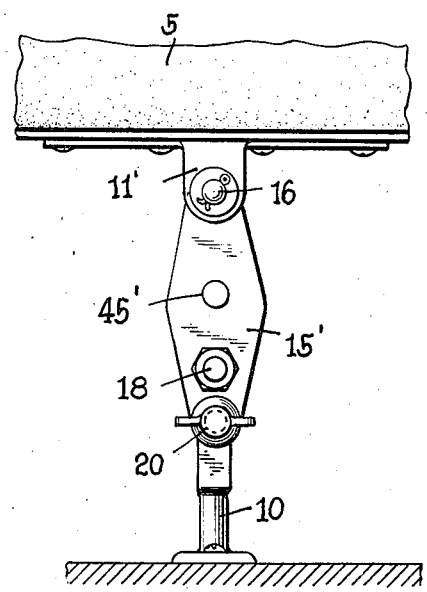
Figs. 8 and 9 are views similar to Figs. 3 and 4, but illustrating the opposite ends of a modified construction of adjusting and locking mechanism.
Figure 9:
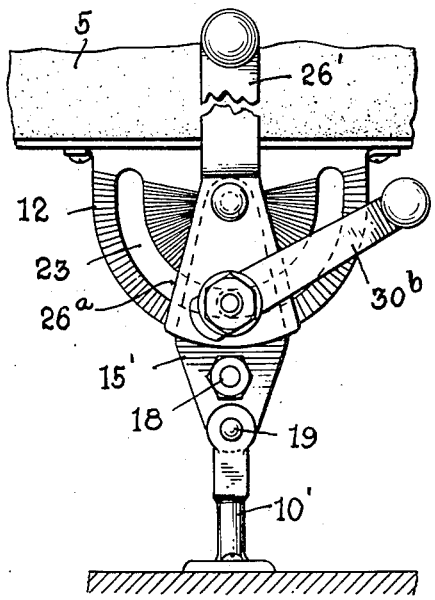

In Figs. 8, 9 and 10, I have illustrated a slightly modified form of adjusting and locking mechanism. In the form shown in the previous figures, it will be seen that the operating lever and locking lever are arranged at opposite sides of the seat, while in the modification shown in Figs. 8, 9 and 10, both of these levers are at the same side of the seat. In these last mentioned figures, the operating lever is designated 26' and the locking lever 30ᵇ. Only a single locking plate is employed, the plate 11 of the previous figures being replaced by a bracket 11'. Other brackets 14' are also secured to the seat and spaced from the bracket 11' and the plate 12 by means of spacing sleeves 42 on the rod 16. The links 15' are shown as formed integral with a tie rod 22' which forms a rigid structure. In order to still further brace and increase the strength of this structure, a strengthening bracket 43, formed in two parts held together by screws 44 extends between and embraces the rods 16, 18 and 22'.

Projecting from the links 15' in axial alignment with the rod 22' are screw threaded studs 45 and 45'. The arcuate slot 23 of the locking plate 12 works freely around one of these studs and the end portion 26ª of the handle 26' also fits over this stud and is held by the rod 16. This end 26ª of the lever constitutes a clamping member.

The locking handle 30ᵇ is secured by means of opposed nuts 46 to a threaded stud 47 carried by a locking nut 48, which works over the threaded stud 45, a washer 49 being preferably interposed between such nut and the member 26ª.

It will be apparent that by tightening up on the nut 48, the locking plate 12 is gripped between the link 15' and the clamping member 26ª, and the parts thus locked in adjusted position.

If desired, the locking nut 48 and associated parts may be assembled in operative relation with the stud 45' on the opposite side of the seat, instead of on the side shown in Fig. 10.

In Fig. 10, the extreme end of the locking lever 30ᵇ is provided with a rounded knob-like hand grip 30ᶜ illustrated as formed by hemispheres of metal secured to the opposite sides of the lever 30ᵇ. In the modification shown in Fig. 10ª, one of these hemispheres is secured to the lever element 30ᵇ and on the opposite face of the lever is a wheel or disk 30ᶜ rotatably secured to the operating lever 30ᵇ by means of a screw. The peripheral edges of the wheel are rounded so as to render the wheel end comfortable to the hand of the person operating it. The purpose of this wheel on the end of the lever is to provide a rolling engagement with the floor of the car when the seat is in either the forward or rearward position and the lever is in the released position, and thus possibly resting on the floor of the car.

Referring now to Fig. 12, I have illustrated a slightly different arrangement in which an operating handle 50 may be secured by nuts to the rod 18 and stud 45' and employed in the combination shown in Fig. 10 in place of the operating lever 26'.

In Figure 11, I have shown a still further modification in which the operating lever is pivoted to an anchoring device carried by the floor, rather than being secured to the swinging frame itself. To an eye member 52 secured to the bottom of the seat is pivotally connected a link 51 which is itself pivotally connected at 53 with a lever 54 pivotally mounted at its lower end in a special anchoring device 55 secured to the floor of the vehicle. This anchoring device is shown as of the bifurcated type having aligned eyes in its two legs.

In connection with this device, I preferably employ an improved pivot pin. As shown in Fig. 13, this comprises a smooth shank 19' having a winged head 20' and provided adjacent the head with a threaded portion 21'. The eye in one leg of the device 55 is internally threaded to receive the threaded portion 21' of the pin. Preferably however the threads on the pin and in the eye are of different character as regards pitch or fineness. This causes the threads to bind when the parts are asembled and accidental displacement of the pin is thus prevented.

This same idea of threads of different character may, if desired, be employed in connection with the long pivot rods 19 shown in the preceding figures.

What I claim is:

1. The combination with a vehicle or other seat, of means for slidably supporting the same at the rear, and means for adjustably supporting the front thereof comprising a rigid frame mounted to swing about a horizontal axis, and pivotally connected with said seat, means for securing the lower side of said frame with respect to the vehicle floor, operating means carried by said frame by which the same may be swung on its axis and the seat thus adjusted, and locking means movable and coacting with said frame and between said seat and floor and in addition to said operating means by which said seat may be locked in any desired adjusted position.

2. The combination with a vehicle or other seat, of a pair of spaced links pivotally connected at one end to said seat adjacent the front thereof, anchoring means on which said links are pivotally mounted at their other end to swing in a vertical plane, means for slidably supporting the rear of said seat, lever means operable by the occupant of the seat for swinging said links about their supporting pivots and thus adjusting said seat angularly and shifting it horizontally, and lever actuated means, also operable by the occupant of the seat, for locking said links in any desired angular position.

3. The combination with a vehicle or other seat, of a pair of spaced links pivotally connected at one end to said seat adjacent the front thereof, anchoring means on which said links are pivotally mounted at their other end to swing in a vertical plane, means for slidably supporting the rear of said seat, means for swinging said links about their supporting pivots to both adjust said seat angularly and shift it horizontally, locking means associated with each of said links for holding them in any desired angular position, and a single means for simultaneously operating both said locking means.

4. The combination with a vehicle or other seat, of a pair of spaced links pivotally connected at one end to said seat adjacent the front thereof, anchoring means on which said links are pivotally mounted at their other end to swing in a vertical plane, a pair of plates rigidly secured to said seat, one adjacent and parallel with each link, a clamping member adjacent each plate, means for simultaneously exerting puressure on said clamping members to cause each to grip the respective plate between itself and the adjacent link to lock said links against movement, means for swinging said links, when released, about their supporting pivots to adjust said seat, and means for slidably supporting the rear of the seat.

5. The combination with a vehicle or other seat, of means for adjustably mounting the front portion thereof comprising a pair of spaced links pivotally connected at one end to said seat, anchoring means on which said links are pivotally supported at their other end to swing in a vertical plane, a pair of plates rigidly secured to said seat, one adjacent and parallel with each link, a clamping member adjacent each plate, a rod passing through both said clamping members and extending transversely of said seat, a threaded member connected with said rod, and a clamping nut working on said threaded member, whereby, when said clamping nut is turned tension is applied to said rod to cause each of said plates to be gripped between the respective clamping members and links, to lock the parts against movement.

6. The combination with a vehicle or other seat, of means for adjustably mounting the front portion thereof comprising a pair of spaced links pivotally connected at one end to said seat, anchoring means on which said links are pivotally supported at their other end to swing in a vertical plane, a plate rigidly secured to said seat adjacent and parallel with one of said links, a clamping member disposed adjacent said plate on the side thereof opposite said link and having an outer cam face, and screw means engaging said link and including a nut having a cam face adapted to engage that of said clamping member, whereby, when said screw means is operated, the cam faces of said nut and clamping member are forced together and said plate gripped between said clamping member and link.

7. The combination with a vehicle or other seat, of means for adjustably mounting the front portion thereof comprising a pair of spaced links pivotally connected at one end to said seat, anchoring means on which said links are pivotally supported at their other end to swing in a vertical plane, a plate rigidly secured to said seat adjacent and parallel with one of said links, a clamping member disposed adjacent said plate on the side thereof opposite said link, a threaded sleeve, means for adjusting said sleeve toward and from said clamping member and for holding it rigidly in any adjusted position, and a clamping nut working on said threaded sleeve adjacent said clamping member, whereby, when said nut is turned on said sleeve, it is forced against said clamping member and the latter caused to grip said plate between itself and said link.

8. The combination with a vehicle or other seat, of means for adjustably mounting the front portion thereof comprising a pair of spaced links pivotally connected at one end to said seat, anchoring means on which said links are pivotally supported at their other end to swing in a vertical plane, a plate rigidly secured to said seat adjacent and parallel with one of said links, a clamping member disposed adjacent said plate on the side thereof opposite said link, a threaded shank projecting laterally of and operatively connected with said link, said plate having an arcuate slot through which said shank extends, and a clamping nut fitting on said threaded shank and serving, when tightened, to force said plate against said link and thus lock the parts against movement.

JULIUS H. RAST.